United States Patent
Cha et al.

(10) Patent No.: US 9,513,821 B2
(45) Date of Patent: Dec. 6, 2016

(54) APPARATUS AND METHOD FOR INDICATING FLASH MEMORY LIFE

(71) Applicant: Industry-University Cooperation Foundation Hanyang University, Seoul (KR)

(72) Inventors: Jae Hyuk Cha, Seoul (KR); Soo Yong Kang, Seoul (KR); You Jip Won, Seoul (KR); Tae Hwa Lee, Seoul (KR); Ho Young Jung, Seoul (KR); Sung Roh Yoon, Seoul (KR); Jong Moo Choi, Gyeonggi-do (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 59 days.

(21) Appl. No.: 14/366,299

(22) PCT Filed: Dec. 10, 2012

(86) PCT No.: PCT/KR2012/010700
§ 371 (c)(1),
(2) Date: Jun. 18, 2014

(87) PCT Pub. No.: WO2013/094914
PCT Pub. Date: Jun. 27, 2013

(65) Prior Publication Data
US 2014/0372681 A1    Dec. 18, 2014

(30) Foreign Application Priority Data

Dec. 23, 2011  (KR) .................. 10-2011-0141316
Aug. 21, 2012  (KR) .................. 10-2012-0091356

(51) Int. Cl.
*G06F 12/16* (2006.01)
*G06F 3/06* (2006.01)
*G06F 12/02* (2006.01)
(Continued)

(52) U.S. Cl.
CPC .......... *G06F 3/0616* (2013.01); *G06F 3/0653* (2013.01); *G06F 3/0679* (2013.01); *G06F 11/1458* (2013.01); *G06F 11/1461* (2013.01); *G06F 12/0246* (2013.01); *G06F 11/1456* (2013.01); *G06F 11/3034* (2013.01);
(Continued)

(58) Field of Classification Search
CPC ..... G06F 12/0246; G06F 2212/72–2212/7211
See application file for complete search history.

(56) References Cited

U.S. PATENT DOCUMENTS

| 7,523,013 B2 | 4/2009 | Gorobets et al. |
| 7,596,656 B2 | 9/2009 | Elhamias |

(Continued)

FOREIGN PATENT DOCUMENTS

| JP | 2004-348332 A | 12/2004 |
| JP | 2005-276288 A | 10/2005 |

(Continued)

*Primary Examiner* — Nicholas Simonetti
(74) *Attorney, Agent, or Firm* — Rabin & Berdo, P.C.

(57) ABSTRACT

The present invention relates to an apparatus and method for indicating flash memory life. While data is being stored in a flash memory, the number of writes in a plurality of blocks of the flash memory increases. The amount of flash memory life is calculated on the basis of the number of write times in the plurality of blocks. The calculated amount of life can be transmitted to a host. In addition, when the calculated amount of life is greater than a threshold value, a signal providing notice that the life of the flash memory has reached a dangerous level can be output.

9 Claims, 4 Drawing Sheets

(51) Int. Cl.
 *G06F 11/14* (2006.01)
 *G06F 11/30* (2006.01)
(52) U.S. Cl.
 CPC ....... *G06F11/3051* (2013.01); *G06F 2201/81* (2013.01); *G06F 2212/7204* (2013.01)

(56) References Cited

U.S. PATENT DOCUMENTS

| | | |
|---|---|---|
| 7,778,077 B2 | 8/2010 | Gorobets et al. |
| 2007/0263444 A1 † | 11/2007 | Gorobets |
| 2007/0266200 A1 | 11/2007 | Gorobets et al. |
| 2008/0082725 A1 | 4/2008 | Elhamias |
| 2008/0082726 A1 | 4/2008 | Elhamias |
| 2010/0064111 A1* | 3/2010 | Kunimatsu ............. G06F 12/08 711/161 |
| 2010/0174851 A1* | 7/2010 | Leibowitz ............. G06F 3/0616 711/103 |
| 2010/0174852 A1* | 7/2010 | Chien ................. G06F 12/0246 711/103 |
| 2010/0257306 A1* | 10/2010 | Kawaguchi ........... G06F 3/0616 711/103 |
| 2011/0179219 A1* | 7/2011 | Ma ........................ G06F 3/0613 711/103 |
| 2011/0197045 A1* | 8/2011 | Okamoto ............ G06F 12/0246 711/166 |

FOREIGN PATENT DOCUMENTS

| | | |
|---|---|---|
| JP | 2007-011811 A | 1/2007 |
| JP | 2009-537904 A | 10/2009 |
| KR | 10-2009-0082365 A | 7/2009 |

\* cited by examiner
† cited by third party

APPARATUS AND METHOD FOR INDICATING FLASH MEMORY LIFE

TECHNICAL FIELD

The present invention relates to a flash memory, and more particularly to a method and apparatus for providing a life indicator of a flash memory.

BACKGROUND ART

A flash memory has a limited life, particularly in writing data. A flash memory includes a plurality of blocks, each of which has a limited number of writing times.

A short life of a flash memory may cause data loss. To overcome such a life issue, various software techniques including wear leveling may be used.

A life issue arises by characteristics of a flash memory. Thus, software techniques may prolong the life of the flash memory but also include constraints.

A method of providing information on the life of a flash memory is needed so as to prevent data saved in the flash memory from being useless due to a short life of the flash memory.

DISCLOSURE OF INVENTION

Technical Goals

An aspect of the present invention provides an apparatus and method enabling a user to identify a life value of a flash memory.

Another aspect of the present invention provides an apparatus and method of backing up data stored in a flash memory according to a life value of the flash memory.

Technical Solutions

According to an aspect of the present invention, there is provided a storage device including a flash memory to store data, and a controller to calculate a life value of the flash memory based on numbers of writing times in a plurality of blocks of the flash memory.

A plurality of flash memories may be provided.

The life value may be a value within a predetermined range.

The controller may calculate the life value based on a variance of the numbers of writing times and a maximum value of the numbers of writing times.

The controller may calculate the life value based on numbers of writing times in blocks which are a threshold value or greater.

The threshold value may be determined based on a maximum number of writing times in a block of the flash memory.

The storage device may further include a connector connected to a host to transmit the life value to the host.

The controller may transmit the calculated life value to the host through the connector when the life value is a threshold value or higher.

The storage device may further include a display unit to output light or sound.

The controller may control the display unit to output the light or sound when the life value is a threshold value or higher.

According to another aspect of the present invention, there is provided an operating method of a storage device using a flash memory, the operating method including storing data in the flash memory, and calculating a life value of the flash memory based on numbers of writing times in a plurality of blocks of the flash memory.

The life value may be calculated based on a variance of the numbers of writing times and a maximum value of the numbers of writing times.

The life value may be calculated based on numbers of writing times in blocks which are a threshold value or greater.

The operating method may further include transmitting the calculated life value to a host using the storage device when the life value is a threshold value or higher.

The operating method may further include outputting light or sound, when the life value is a threshold value or higher.

According to still another aspect of the present invention, there is provided an electronic device including a storage device including a flash memory, and a processor to control the storage device, wherein the storage device transmits, to the processor, a life value of the storage device calculated based on numbers of writing times in a plurality of blocks of the flash memory, and the processor determines whether to back up data in the storage device based on the life value.

The electronic device may further include a backup storage device.

The processor may read the data in the storage device and write the data in the backup storage device when determining to back up the data.

According to yet another aspect of the present invention, there is provided an operating method of an electronic device which includes calculating by a storage device a life value of a storage device based on numbers of writing times in a plurality of blocks of a flash memory in the storage device, transmitting by the storage device the calculated life value to a processor, and determining by the processor whether to back up data in the storage device based on the life value.

Advantageous Effects

There are provided an apparatus and method enabling a user to identify a life value of a flash memory. The user may identify the life value of the flash memory and accordingly response to a caution about the life value.

There are provided an apparatus and method of backing up data stored in a flash memory according to a life value of the flash memory.

BEST MODE FOR CARRYING OUT THE INVENTION

Figure 1:
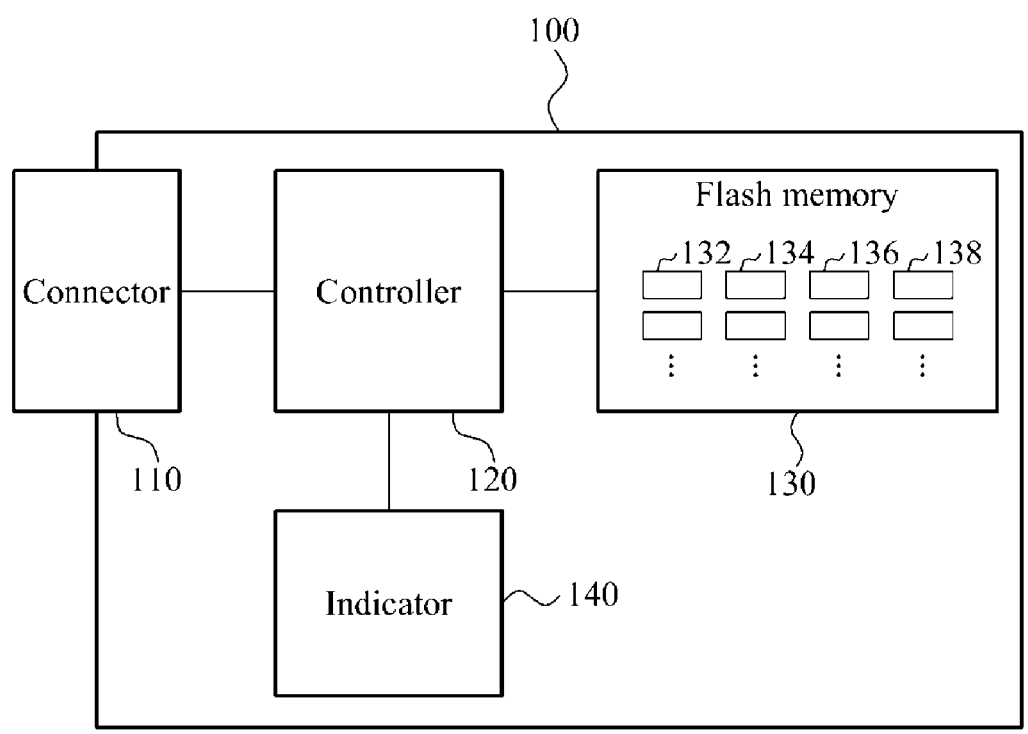
FIG. 1 is a block diagram illustrating a storage device according to an exemplary embodiment.

Hereinafter, exemplary embodiments will be described in detail with reference to the accompanying drawings. Like reference numerals refer to the like elements throughout.

A number of times writing data in a block of a flash memory is the same as a number of times deleting data from the block or proportional to the number of deleting times. Thus, the terms "number of writing times" and "number of deleting times" may be used to refer to the same meaning and be replaced with each other.

FIG. 1 is a block diagram illustrating a storage device according to an exemplary embodiment.

The storage device 100 may include a connector 110, a controller 120, a flash memory 130 and an indicator 140.

The storage device 100 may refer to any device which includes a flash memory and is connected to a host, for example, a universal serial bus (USB) storage device, a flash memory card, a solid state drive (SSD), an MP3 player, a mobile phone and a tablet. The host is an electronic device, such as a personal computer (PC), which may write data in the storage device 100 connected to the host or read data from the storage device 100.

The connector 110 may connect the storage device 100 to the host. The connector 110 may provide an interface of the storage device 100 to the host.

The connector 110 may be an interface port in accordance with a predetermined standard, such as a USB, an Institute of Electrical and Electronics Engineers (IEEE) 1394 and an advanced technology attachment (ATA). Alternatively, the connector 110 may be a chip for data transmission between the host and the storage device 100. The connector 110 may transmit data output from the controller 120 to the host or transmit data output from the host to the controller 120. For instance, the connector 110 may be connected to the host to transmit a life value calculated by the controller 120 to the host.

The connector 110 may be a port or interface component providing wire-based or wireless networks, for example, an Ethernet port, a Bluetooth chip and a wireless fidelity (Wi-Fi) chip. The host and the storage device 100 may be connected to each other through a wire-based or wireless network.

The controller 120 may access data in the flash memory 130 according to a request from the host. The controller 120 may read data requested by the host from the flash memory 130 and transmit the data to the host through the connector 110. Further, the controller 130 may write data transmitted from the host in the flash memory 130. The controller 120 may perform a function of a flash translation layer (FTL).

The flash memory 130 may store data. The flash memory 130 may include a plurality of blocks. FIG. 1 shows a first block 132, a second block 134, a third block 136 and a fourth block 138.

Each of the blocks may be a unit of accessing data, for example, reading, writing, updating and deleting data, or a unit of operation. That is, the controller 120 may access data in the flash memory 130 by a block and provide an operation with respect to the flash memory 130. The blocks may be different from a unit of data requested by the host.

Each of the blocks may have a limited number of writing times. Numbers of writing times of the blocks may be managed as metadata by the controller 120. The numbers of writing times of the blocks may be based on characteristics of the flash memory 130. The number of writing times of each block may increase by 1 whenever new data is written in the block. The controller 120 may map a logical address used by the host and a physical address used to access the flash memory 130. Thus, the host is unable to know in which block of the flash memory 130 data is actually written, with a logical address of data that the host requests to write. The controller 120 may also provide different functions to reduce writing in a block, for example, buffering, cashing and wear-leveling. Thus, the host is unable to know not only in which block of the flash memory 130 data is actually written by request but also whether the data is actually written in the flash memory 130.

When the number of writing times of at least one block reaches a maximum value, additional writing may be impossible in the block and the entire flash memory 130 may be unavailable.

A plurality of flash memories 130 may be provided. Each of the flash memories may include a plurality of blocks. A life value may be calculated for each of the flash memories. Also, the plurality of physical flash memories may be considered as a single flash memory 130.

The indicator 140 may display that life of the flash memory 130 reaches a dangerous level. The indicator 140 may output light or sound. When the life of the flash memory 130 reaches the dangerous level, the controller 120 outputs light or sound through the indicator 140, thereby informing a user of the storage device 100 that the life of the flash memory 130 reaches the dangerous level.

The indicator 140 may be a light emitting diode (LED) outputting light or a speaker outputting sound.

Figure 2:
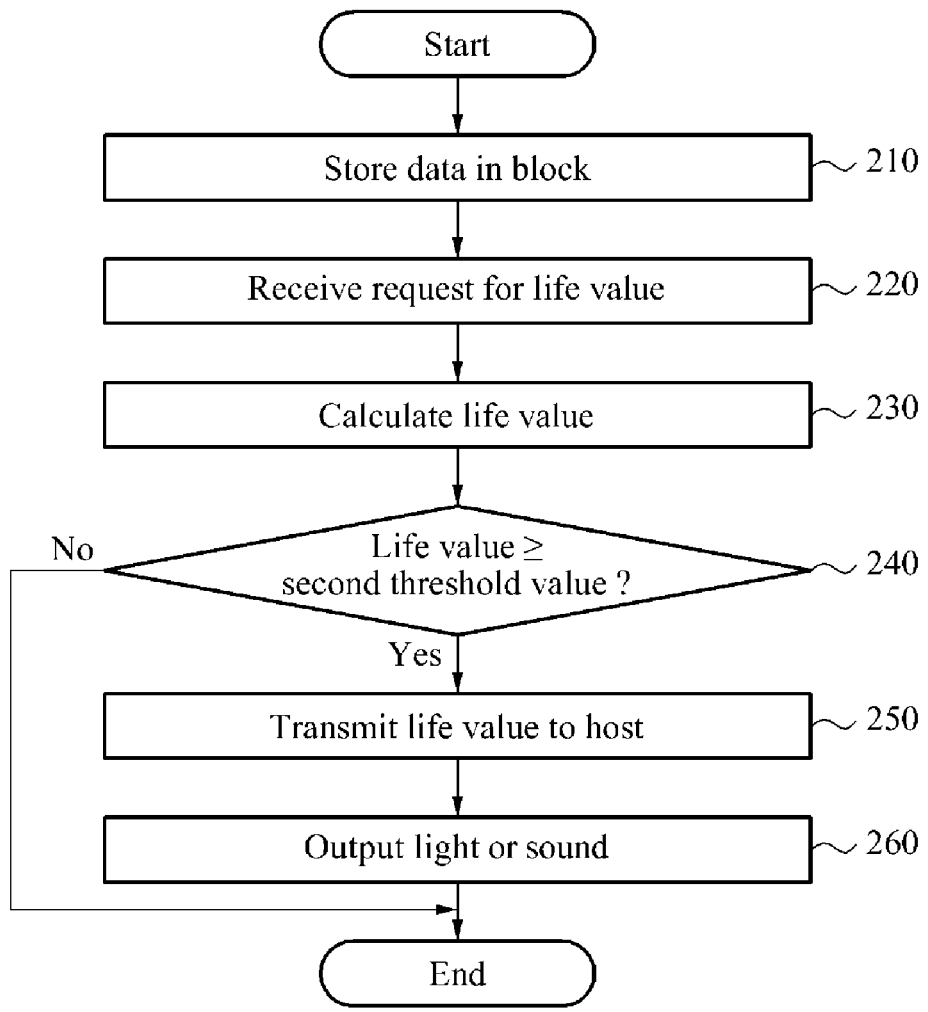
FIG. 2 is a flowchart illustrating an operating method of the storage device using a flash memory according to an exemplary embodiment.

FIG. 2 is a flowchart illustrating an operating method of the storage device using the flash memory according to an exemplary embodiment.

In operation 210, the controller 120 may store data in the flash memory.

The controller 120 may store the data in a block selected for processing a data access request from the host among the plurality of blocks of the flash memory 130. The controller 120 may update a number of writing times of the selected block. The number of writing times of the selected block may be managed as metadata. The metadata may be stored in a particular block of the flash memory 130 or in a cache (not shown) of the storage device 100, such as random access memory (RAM).

In operation 220, the controller 120 may receive a request for a life value of the storage device 100 from the host through the connector 110. Operation 220 is an optional process, and the controller 120 may transmit the calculated life value to the host as necessary without a request from the host.

In operation 230, the controller 120 may calculate the life value of the flash memory 130 or the storage device 100 based on the numbers of writing times of the plurality of blocks of the flash memory 130.

The controller 120 may calculate the life value according to Equation 1 and Equation 2.

A set T may be a group of the numbers of writing times of the plurality of blocks of the flash memory 130. The numbers of writing times may be an integer which is "0" or greater.

A set P may be a group of blocks having a number of writing times that is a first threshold value or greater among the plurality of blocks of the flash memory 130. That is, the controller 120 may calculate the life value based on numbers of writing times of the blocks that are the threshold value or greater. The first threshold value may be determined based on a maximum number of writing times in a block of the flash memory 130. The first threshold value may be obtained by multiplying the maximum number of writing times of the block and a correction factor of a real number greater than 0 and less than or equal to 1. For example, the set P may be defined by Equation 1.

$$P = \{x | x \in T, x \geq \text{EraseCount}_{Max} * 0.8\} \quad \text{[Equation 1]}$$

Here, EraseCount$_{Max}$ may be a maximum number of writing times of a block. 0.8 may be an example of a correction factor. x may represent each block of the flash memory 130.

When the set P includes one or more elements, the controller 120 may calculate the life value based on Equation 2. When the set P includes no element, the controller 120 may calculate the life value based on Equation 3.

$$s*\left(\frac{P_{Max}}{EraseCount_{Max}}*100\right)+(1-s)\left(\frac{V}{V_{Max}}*100\right) \quad \text{[Equation 2]}$$

$$(1-s)*\left(\frac{P_{Max}}{EraseCount_{Max}}*100\right)+s*\left(\frac{V}{V_{Max}}*100\right) \quad \text{[Equation 3]}$$

Here, P$_{Max}$ may be a maximum value of elements in the set P. P$_{Max}$ may be a maximum value of the numbers of writing times of the blocks of the flash memory 130.

V may be a variance of the numbers of writing times of the blocks of the flash memory 130. V$_{Max}$ may be a maximum variance of the numbers of writing times of the blocks of the flash memory 130. That is, V$_{Max}$ may be a maximum variance allowed for the numbers of writing times of the blocks of the flash memory 130. For example, if the flash memory 130 includes 2n blocks, V$_{Max}$ may be a V value when numbers of writing times of n blocks of the flash memory 130 is 0 and numbers of writing times of remaining n blocks EraseCount$_{Max}$. n may be an integer that is "1" or greater.

s may be a weighting. s may be a value to adjust importance between left and right terms. s may be a real number from "0" to "1". s may be a real number of "0.5" or greater for calculating a meaningful life value.

As described above with reference to Equation 1 to Equation 3, the life value calculated by the controller 120 may be a value within a predetermined range. The life value may be a value from "0" to "100". The controller 120 may calculate the life value based on at least one of S, P, P$_{Max}$, V, V$_{Max}$ and EraseCount$_{Max}$. The controller 120 may calculate the life value of the flash memory 130 based on a variance of the numbers of writing times of the blocks of the flash memory 130 and a maximum value of the numbers of writing times. For example, the calculated life value may be proportional to at least one of P$_{Max}$ and V and inversely proportional to at least one of V$_{Max}$ and EraseCount$_{Max}$. Further, as described above with reference to Equation 1, the numbers of writing times used to calculate the life value may be limited to a number of writing times of the threshold value or greater.

In operation 240, the controller 120 may compare the calculated life value with a second threshold value. When the calculated life value is the second threshold value or greater, at least one of following operations 250 and 260 may be carried out. When the calculated life value is lower than the second threshold value, a process may be finished.

When the calculated life value is the second threshold value or greater, the controller 120 may transmit the life value to the host using the storage device 100 through the connector 110 in operation 250. When the host requests the life value in operation 210, operation 250 may be always performed without comparing the calculated life value with the second threshold value. Alternatively, operation 250 may be periodically performed.

When the calculated life value is the second threshold value or greater, the controller 120 may control the indicator 140 to output light or sound in operation 260. When light or sound is output from the indicator 140, the user may recognize that life of the flash memory 130 or the storage device 100 reaches a dangerous level.

Figure 3:
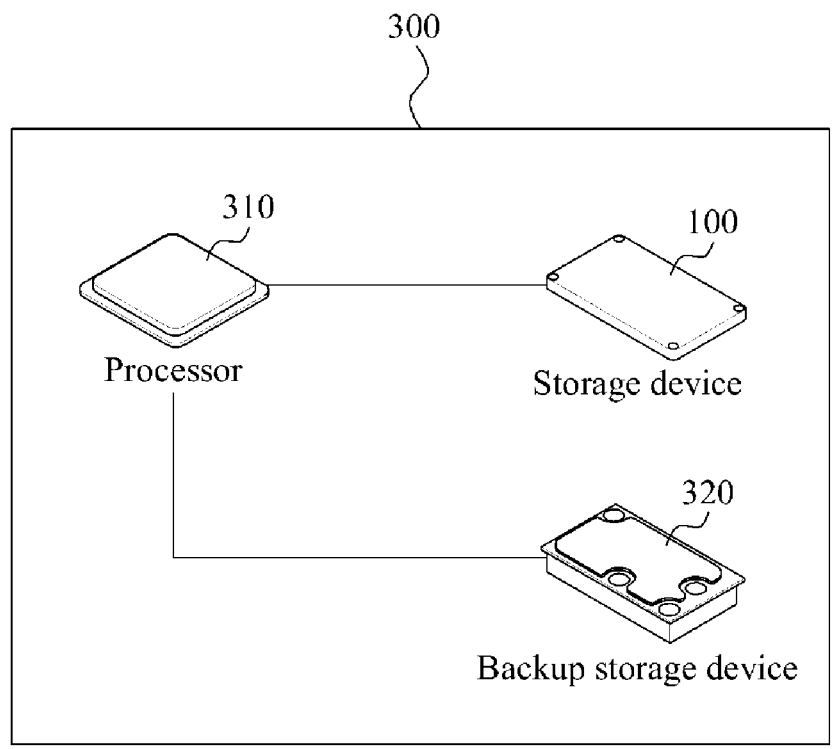
FIG. 3 is a block diagram illustrating an electronic device according to an exemplary embodiment.
Figure 4:
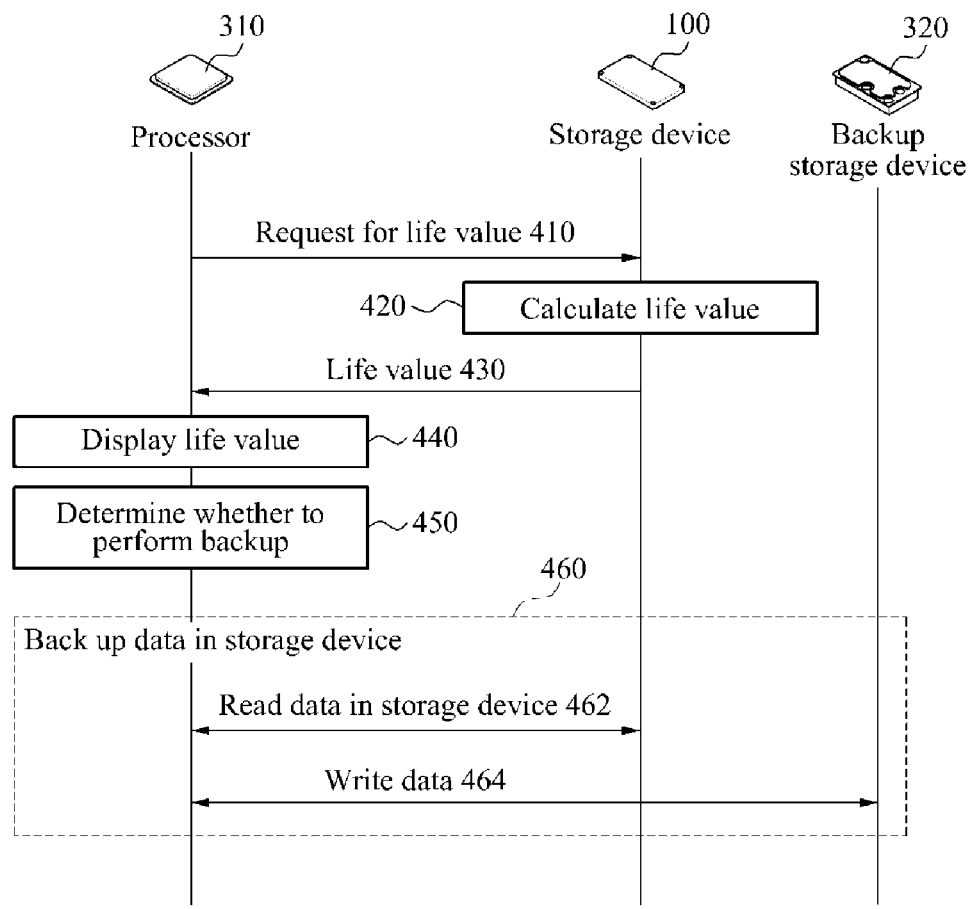
FIG. 4 is a signal flow diagram illustrating an operating method of the electronic device according to an exemplary embodiment.

FIG. 3 is a block diagram illustrating an electronic device according to an exemplary embodiment.

The electronic device 300 may be the host illustrated above with reference to FIGS. 1 and 2. That is, the electronic device 300 may be an apparatus using the storage device 100.

The electronic device 300 may include a processor 310, a storage device 100 and a backup storage device 320.

The processor 310 may process operations necessary for operations of the electronic device 300 and control the storage device 100 and the backup storage device 320. The processor 310 may access data stored in the storage device 100 and data stored in the backup storage device 320.

The storage device 100 and the backup storage device 320 may store data of the electronic device 300. The backup storage device 320 may be used to back up data of the storage device 100. The backup storage device 320 may be also a storage device 100 using a flash memory and providing a life value.

FIG. is a signal flow diagram illustrating an operating method of the electronic device according to an exemplary embodiment.

In operation 410, the processor 310 may transmit a request for a life value of the storage device 100 to the connector 110 of the storage device 100. Operation 410 is an optional process, and the storage device 100 may calculate the life value without an explicit request from the processor 310 and transmit the calculated life value to the processor 310 according to a predefined protocol.

In operation 420, the controller 120 of the storage device 100 may calculate the life value of the storage device 100. Here, the life value of the storage device 100 may be a life value of the flash memory 130. As described above in FIG. 2, the life value of the storage device 100 may be calculated based on the numbers of writing times of the plurality of blocks of the flash memory 130 of the storage device 100.

In operation 430, the controller 120 of the storage device 100 may transmit the life value to the processor 310 through the connector 110. The controller 120 may transmit the life value to the processor 310 only when the calculated life value is the second threshold value or greater.

In operation 440, the processor 310 may display the transmitted life value. The transmitted life value may be displayed through an application running on the electronic device 300. The user may recognize the displayed life value and take proper action based on the life value, for example, back up data in the storage device 100.

In operation 450, the processor 310 may determine whether to back up the data in the storage device 100 based on the transmitted life value. For instance, the processor 310 may perform operation 460 when the life value is the second threshold value or greater.

In operation 460, when backup is determined, the processor 310 may back up the data of the storage device 100 in the backup storage device 320. That is, the processor 310 may read the data in the storage device 100 and write the data in the backup storage device 320.

Operation 460 may include operations 462 and 464.

In operation 462, the processor 310 may read the data in the storage device 100.

In operation 464, the processor 310 may write the data read from the storage device 100 in the backup storage device 320.

Operations 462 and 464 may be repeated until data in the storage device 100 which requires backup is completely backed up.

The foregoing devices may be realized by hardware elements, software elements and/or combinations thereof. For example, the devices and components illustrated in the exemplary embodiments may be implemented in one or more general-use computers or special-purpose computers, such as processor, controller, arithmetic logic unit (ALU), digital signal processor, microcomputer, field programmable array (FPA), programmable logic unit (PLU), microprocessor or any device capable of executing instructions and responding. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described exemplary embodiments of the present invention may be recorded in non-transitory computer-readable media including program instructions to implement various operations embodied by a computer. The media may also include, alone or in combination with the program instructions, data files, data structures, and the like. The program instructions recorded in the media may be designed and configured specially for the exemplary embodiments or be known and available to those skilled in computer software. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

What is claimed is:

1. A storage device comprising:
   a flash memory to store data and having a plurality of blocks; and
   a controller to calculate a life value of the flash memory based on counts to a group of blocks of the flash memory,
   wherein each block of the group of blocks has a writing count equal to or greater than a first threshold value,
   wherein the first threshold value is determined based on a maximum writing count of the flash memory,
   wherein the life value is calculated by using
      (i) a maximum value among the writing counts of the group of blocks,
      (ii) a variance of the writing counts of the group of blocks,
      (iii) a maximum value of the variance, and
      (iv) a weighting value having a real number from "0" to "1", and
   wherein backup operations related to the storage device are performed when the life value is equal to a second threshold value or greater.

2. The device of claim 1, further comprising a connector connecting the controller to a host to transmit the life value to the host.

3. The device of claim 2, wherein the controller transmits the calculated life value to the host through the connector when the life value is equal to the second threshold value or greater.

4. The device of claim 1, further comprising a display unit to output light or sound, wherein the controller controls the display unit to output the light or sound when the life value is equal to the second threshold value or greater.

5. An operating method of a storage device including a flash memory, a controller and a display unit, the method comprising:
   storing data in the flash memory having a plurality of blocks; and
   calculating a life value of the flash memory based on writing counts to a group of blocks of the flash memory,
   wherein each block of the group of blocks has a writing count equal to or greater than a first threshold value,
   wherein the first threshold value is determined based on a maximum writing count of the flash memory,
   wherein the life value is calculated by using
      (i) a maximum value among the writing counts of the group of blocks,
      (ii) a variance of the writing counts of the group of blocks,
      (iii) a maximum value of the variance, and
      (iv) a weighting value having a real number from "0" to "1", and
   wherein backup operations related to the storage device are performed when the life value is equal to a second threshold value or greater.

6. The method of claim 5, further comprising transmitting the calculated life value to a host using the storage device when the life value is equal to the second threshold value or greater.

7. The method of claim 5, further comprising outputting light or sound to the display unit, when the life value is equal to the second threshold value or greater.

8. An electronic device comprising:
a storage device comprising a flash memory having a plurality of blocks; and
a processor to control the storage device,
wherein the storage device transmits, to the processor, a life value of the storage device calculated based on writing counts to a group of blocks of the flash memory, and the processor determines whether to back up data in the storage device based on the life value,
wherein each block of the group of blocks has a writing count equal to or greater than a first threshold value,
wherein the first threshold value is determined based on a maximum writing count of the flash memory,
wherein the life value is calculated by using
(i) a maximum value among the writing counts of the group of blocks,
(ii) a variance of the writing counts of the group of blocks,
(iii) a maximum value of the variance, and
(iv) a weighting value having a real number from "0" to "1", and
wherein backup operations related to the storage device are performed when the life value is equal to a second threshold value or greater.

9. The electronic device of claim 8, further comprising a backup storage device,
wherein the processor reads the data in the storage device and writes the data in the backup storage device when determining to back up the data.

* * * * *